United States Patent [19]
Baker, Jr. et al.

[11] 3,820,391
[45] June 28, 1974

[54] DEEP SEA PRESSURE GAUGE

[75] Inventors: Donald James Baker, Jr., Cambridge; Ivan Winfield Hill, Newton; Richard B. Wearn, Jr., Cambridge, all of Mass.

[73] Assignee: The United States of America as represented by the Secretary of the Navy, Washington, D.C.

[22] Filed: Apr. 12, 1973

[21] Appl. No.: 350,563

[52] U.S. Cl. ............... 73/170 A, 73/345, 73/398 C, 73/418
[51] Int. Cl. ........................................... G01i 19/00
[58] Field of Search...... 73/170 A, 300, 345, 398 R, 73/292, 343 R, 418, 398 C

[56] References Cited
UNITED STATES PATENTS
| | | | |
|---|---|---|---|
| 2,955,467 | 10/1960 | Parkhurst | 73/300 |
| 3,473,383 | 10/1969 | Dubach | 73/345 |
| 3,538,772 | 11/1970 | Filloux | 73/170 A |

*Primary Examiner*—Donald O. Woodiel
*Attorney, Agent, or Firm*—R. S. Sciascia; L. I. Shrago

[57] ABSTRACT

A deep sea pressure gauge for measuring and recording pressure and temperature stably and accurately over long periods of time at the sea floor is provided. A fused quartz Bourdon tube pressure sensor and a quartz crystal oscillator temperature sensor provide high stability at low power. Only pressure variations from the sea floor pressure are measured, the mirror of the Bourdon tube rotating at a rate proportional to this pressure differential and controlling an angular position transducer having a frequency output. The pressure and temperature signals measured are average values covering the time between recordings. An argon-filled bag exposed to sea pressure is connected to the interior of the Bourdon tube to establish the initial, bottom pressure while the exterior of the Bourdon tube is exposed to oil which is maintained at ambient pressure by connection to an oil filled bag exposed to sea pressure.

12 Claims, 4 Drawing Figures

DEEP SEA PRESSURE GAUGE

This invention concerns deep sea pressure measuring and, more particularly, a deep sea pressure gauge which is adapted to measure and record pressure and temperature stably and accurately over long periods of time at the sea floor.

Presently available deep sea pressure gauges are inadequate for measuring the long-term fluctuations in pressure in the sea, i.e. fluctuations over periods greater than the diurnal tides. These fluctuations include the fundamental free and forced Rossby modes of the ocean which have been observed only from island stations. Their role in the general circulation of the oceans is not yet understood and scattering from bottom topography may be severe. The few existing measurements available indicate that any instrument for measuring the long-term fluctuations must operate on the deep ocean floor, be capable of a dynamic range of at least 1 atmosphere and yet be sensitive to and stable to at least 0.1 mb over periods of several weeks. These requirements are met by the presently disclosed deep sea pressure gauge.

The pressure gauge of the present invention utilizes an optical servo readout system which provides a continuous readout which can easily be made digital. The gauge is operable at low power and at the high pressures on the sea floor at any depth for periods up to one year. The pressure sensor, a fused quartz Bourdon tube, senses pressure fluctuations, while the temperature sensor comprises a quartz crystal oscillator whose sensing element is placed in close proximity to the Bourdon tube. A mirror is attached to the end of the Bourdon tube which has a configuration that causes a rotation proportional to the ambient pressure. This rotation is measured by an optical servo system which controls an angular position transducer having a selected frequency output. The pressure signal and temperature signal are averaged over a given time interval and their outputs plus the time reading from a master clock are recorded on a 4-track tape. The pressure and temperature signals are averaged values over the time between recordings, a feature which introduces a large amount of smoothing of the recorded data. The minimum sample time is about one second, however, the averaging time and sampling time can be varied within selected limits.

Accordingly, it is an object of the present invention to provide a highly reliable and accurate deep sea pressure gauge which can be used at any depth for periods of up to one year.

Another object of this invention is to provide a deep sea pressure gauge which utilizes low power and low cost components and yet exhibits a high stability.

A further object of this invention is to provide a deep sea pressure gauge which includes an adjustable and continuous readout system that produces readouts which can easily be made digital.

Other objects, advantages, and novel features of the invention will become apparent from the following detailed description thereof when considered in conjunction with the accompanying drawings in which like numerals represent like parts throughout and wherein.

Figure 1:
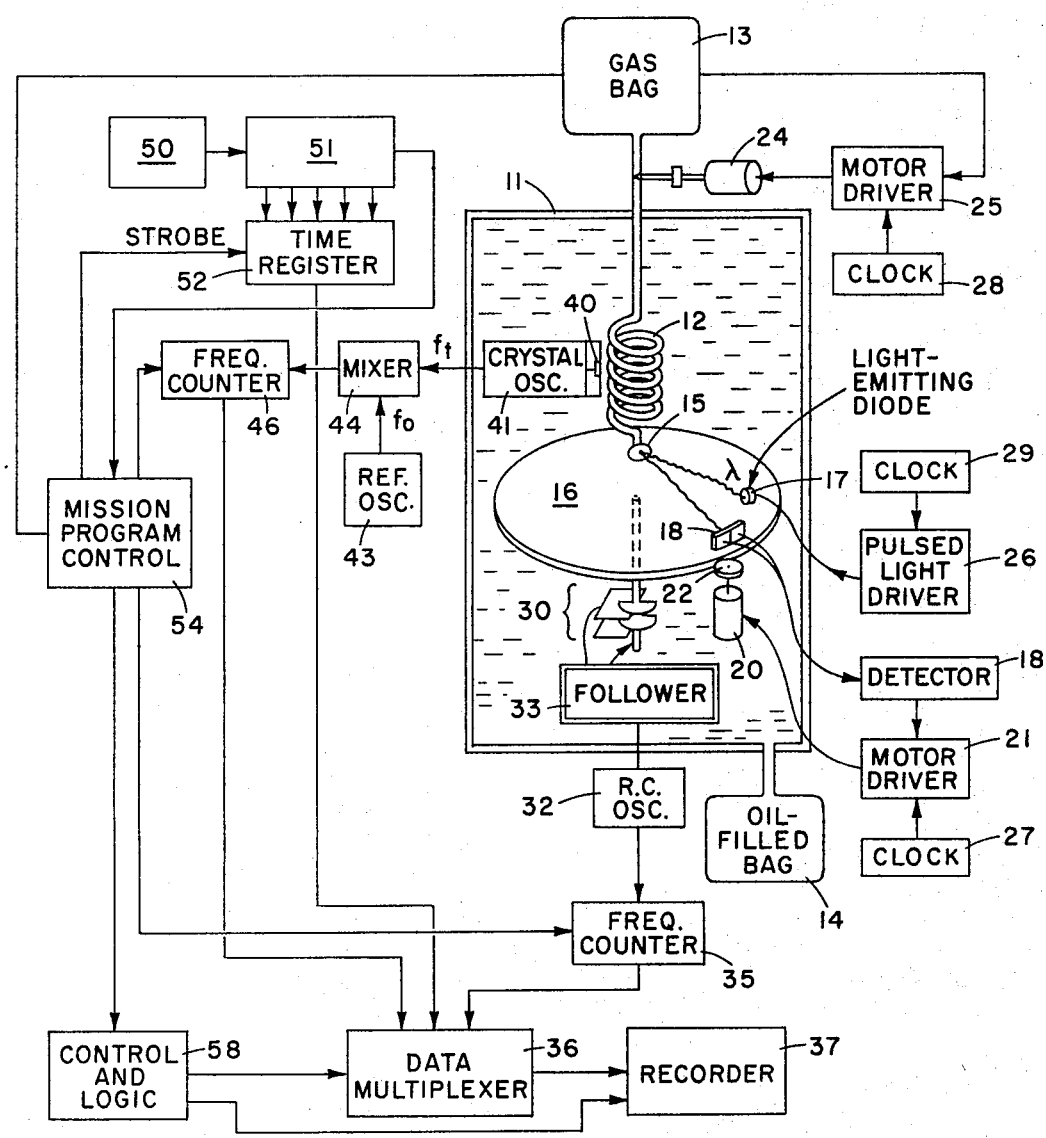
FIG. 1 is a block and schematic diagram illustrating the system of the invention and its operation.

Referring to FIG. 1, the elements of the invention are illustrated schematically and include a pressure-tight case 11 containing a quartz Bourdon tube 12 which is connected internally to a gas bag 13, preferably filled with argon, which is disposed outside of case 11. The exterior surface of tube 12 is exposed to ambient pressure by the oil-filled interior of case 11 being connected to an exteriorly disposed oil-filled bag 14.

A mirror 15 is connected to the end of tube 12 remote from bag 13. Disposed below mirror 15 is a servo table 16 which has mounted on it a light-emitting diode 17 and a dual photocell detector 18 for intercepting the light which emanates from diode 17 and is reflected by mirror 15.

A reversible stepping motor 20 driven by a driver 21 is provided for rotating table 16 through a gear reduction unit 22 in response to rotary movement of mirror 15. The movement of table 16 is detected by a variable precision detector 30. A valve, not shown, in the communicating line between gas bag 13 and tube 12 is closed under selected conditions by a valve control motor 24 which is driven by a reversible stepping motor driver 25. A pulsed light driver 26 drives diode 17. Motor drivers 21 and 25 and light driver 26 are controlled, respectively, by clocks 27, 28 and 29.

The position of table 16 is determined by a variable precision detector 30 which controls a precision RC oscillator 32 through a high impedance follower 33. The output of oscillator 32 is counted by a frequency counter 35 and sent to a data multiplexer 36 and thence to a tape recorder 37.

Temperature measurement is accomplished by means of a temperature sensitive quartz crystal 40 which controls the frequency of a crystal oscillator 41. A temperature insensitive oscillator 43, preferably operated at 10 MHz, provides an output which is mixed in a mixer 44 with the output of crystal oscillator 41 to provide a signal whose frequency is proportional to temperature. The output of mixer 44 is counted by a frequency counter 46 and sent to data multiplexer 36 and thence to a tape recorder 37.

The data collection system of the invention includes a master crystal oscillator 50 which preferably is operated at 74.6 KHz, the output of oscillator 50 being divided as necessary by a clock divider chain 51 to provide signals at desired time intervals to a time register 52. Time register 52 is connected to a mission program control 54, preferably by a strobe, with time register 52 averaging the data signals over the desired sampling time and turning valve control motor 24 on and off at the selected times. A tape control and format logic component 58, which is connected to the intermediate mission control 54 and tape recorder 37, insures that the acquired data is placed on the tape in tape recorder 37 in the desired format and at the rate desired. Although any suitable tape recorder may be employed, the recorder in the preferred embodiment preferably is a 4-track cassette-type recorder.

Figure 2A:
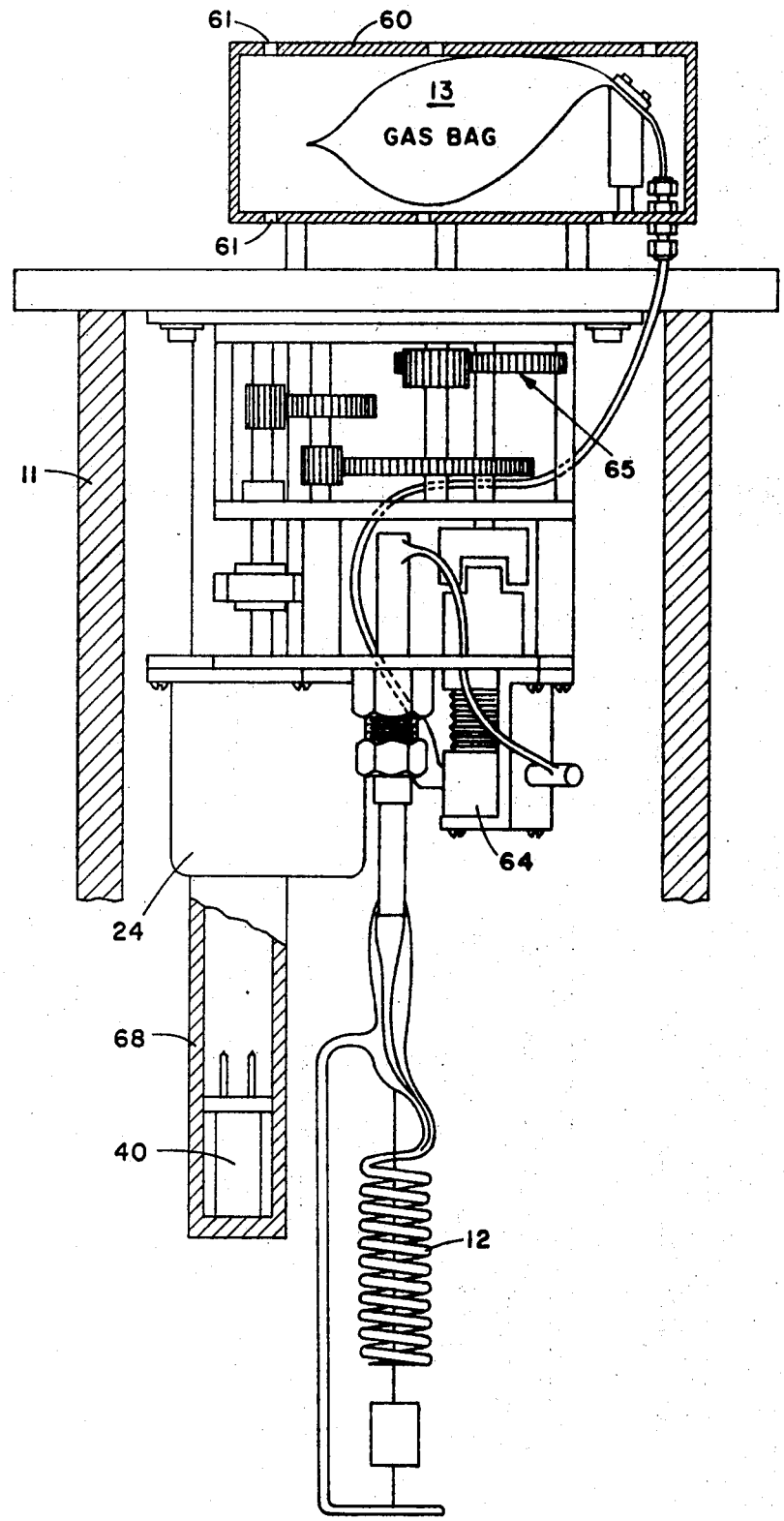
FIG. 2A is a cutaway front elevation of the upper portion of assembled components of one embodiment of the invention.
Figure 2B:
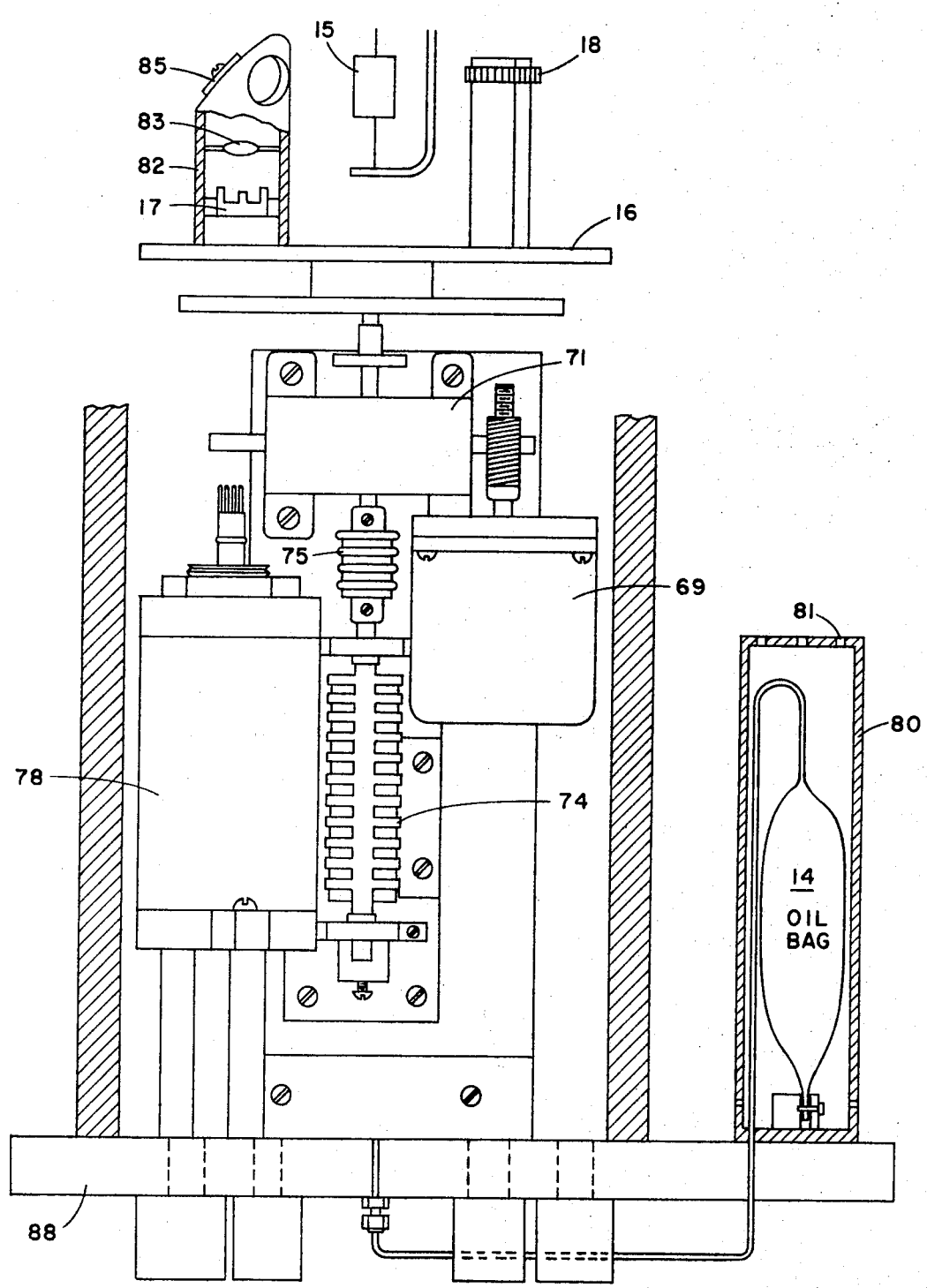
FIG. 2B shows the lower portion of the embodiment shown in FIG. 2A.

In FIGS. 2A and 2B a preferred embodiment of the invention is presented in which gas bag 13 is confined in a housing 60 having a plurality of vent holes 61 to expose the bag to ambient pressure. Valve motor 24 controls a valve 64 through a valve-gear reduction system 65 to provide for a precise closing of valve 64 at the occurrence of a selected pressure condition. Temperature crystal 40 and necessary electronic components for providing a signal whose frequency is proportional to temperature are contained in a pressure case 68. Table 16 is rotated in response to the rotation of Bourdon tube 12 by a servo motor 69 through a servo reduction gear system 71. The angular position readout for table 16 includes a rotatable capacitor 74 which is directly coupled to table 16 by a bellows coupling 75, capacitor 74 controlling the frequency of RC oscillator 32 which is enclosed in pressure case 78. Oil bag 14 is confined in a housing 80 having vent holes 81 to admit water under ambient pressure. Light-emitting diode 17 preferably is mounted in a frame 82 so as to direct a pulsating light beam vertically upward through a focusing lens 83 to a mirror 85 which directs the beam to Bourdon tube mirror 15. The entire assembly preferably is mounted on a common base plate 88.

Figure 3:
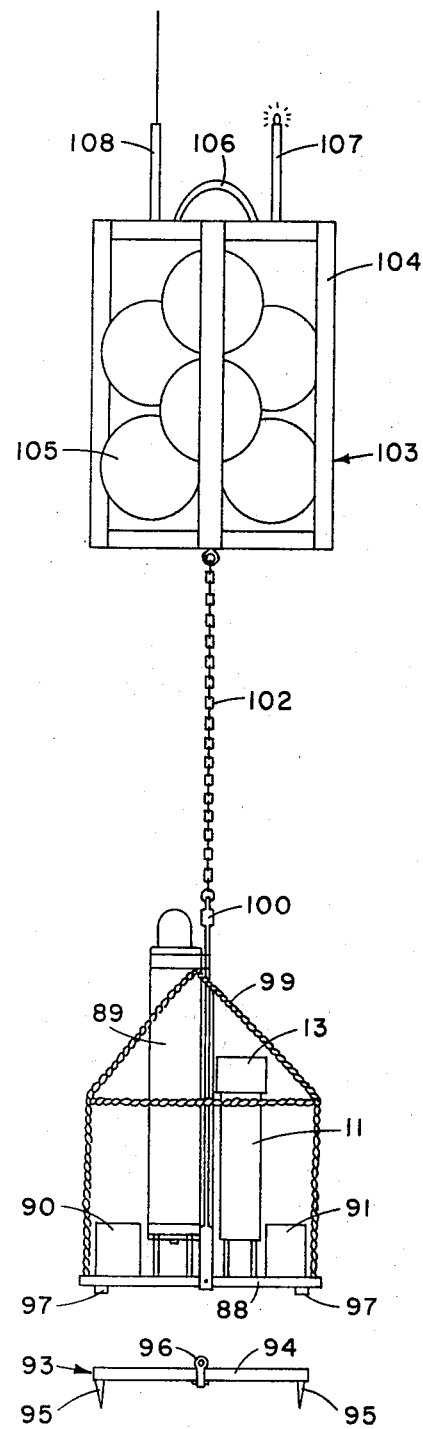
FIG. 3 is a schematic drawing of a mooring system for deploying the embodiment of FIG. 1.

FIG. 3 illustrates one manner in which the invention may be deployed for operation. A conventional transponding acoustic release mechanism 89 such as AMF Model 322 is attached to base plate 88 and has three command capabilities, transponder enable, transponder disable, and release and open valve.

The releases selected operate on modulation channel 6, listen on either 9 or 11 KHz and transpond on 10 KHz. The mechanism may be operated with standard AMF deck equipment. Base plate 88 supports, in addition to the release mechanism and the pressure gauge, batteries as indicated at 90 and 91. An anchor 93 which includes a metal plate 94 and legs 95 is attached to base plate 88 by a shackle 96. A pair of bumpers 97 for absorbing shock are mounted on the bottom of base plate 88. Release mechanism 89 extends through base plate 88 and attaches to plate 94 of anchor 93. A frame 99 is secured to the base plate 88 and includes an eyebolt 100 to which a chain 102 is connected. A buoyant assembly 103 is secured to chain 102. Assembly 103 preferably includes a fiber glass frame 104 which confines a plurality of spheres 105 having a hard protective outer shell and a lifting bale 106. A flasher 107 and a CB transmitter 108 are mounted on the upper surface of assembly 103 to enable communication with the release mechanism and to facilitate surface recovery.

In operation, gas bag 13 is exposed to ambient seawater pressure. Valve 64 is maintained in the open condition until the pressure gauge reaches temperature equilibrium at the sea floor. At that time, valve 64 is closed by valve control motor 24 which is driven by reversible stepping driver 25. After valve 64 is closed, pressure changes occurring in oil-filled case 11 through oil bag 14 cause mirror 15, which is attached to Bourdon tube 12, to rotate and produce an out-of-balance light signal at dual photocell detector 18. The output of detector 18 drives reversible stepping motor 69 which rotates table 16 through servo gear reduction system 71 until the light signal originating from light emitting diode 17 is balanced. The motion of table 16 is now proportional to pressure and is measured by variable precision capacitor 74 which controls the frequency of precision RC oscillator 32. The output of oscillator 32 is counted by frequency counter 35 and the counted information is sent to data multiplexer 36 and thence to tape recorder 37.

Since very small temperature fluctuations can produce significant pressure fluctuations in the argon gas confined in Bourdon tube 12, an accurate and stable temperature measurement is required. This temperature measurement is obtained by means of temperature sensitive crystal 40, which preferably is placed substantially three centimeters from tube 12 and controls the frequency of crystal oscillator 41. The output of oscillator 43 is mixed with the output of oscillator 41 to provide a signal whose frequency is proportional to temperature. This signal is sent to frequency counter 46 and thence to data multiplexer 36 and tape recorder 37.

The data collection system includes master crystal oscillator 50, clock divider 51, time register 52, mission program control 54 and tape control and format logic 58. Time register 52 and mission program control 54 operate on the signals obtained from master crystal oscillator 50 and clock divider 51, averaging the data signals over the desired sampling times and turning valve motor 64 on and off at the desired time. Mission program control 54 also causes valve control motor 24 to open valve 64 when pressure measurements are completed.

The form of Bourdon tube used in the invention comprises an aluminized mirror which is attached to the tube and to an axial quartz rod which is stabilized by torsional quartz fiber hinges. This arrangement exhibits hysteresis and fatigue less than $3 \times 10^{-3}$mb over periods of several months, and has a temperature coefficient of 0.04 mb/°C. The tube can withstand overpressures of 1 atm. and shocks of 8 g's in any direction. Mirror 15 can rotate 270° in either direction.

The volume of argon trapped in bag 13, which is preferably made of plastic, is forced through valve 64 into Bourdon tube 12 as ambient pressure increases. At the desired ambient pressure, valve 64 is closed and the pressure inside tube 12 remains substantially constant thereafter. Subsequent pressure differentials within pressure case 11, which are caused by temperature and pressure fluctuations in the medium, produce rotary movement of Bourdon tube 12 by elongation or contraction of the tube as the pressure differential increases or decreases, respectively. The associated volume variation inside tube 12 makes the pressure sensitivity a slowly varying function of ambient pressure, but this effect is minor and does not degrade the accuracy of the instrument.

The mooring system employed permits the buoyant or floatation assembly to be put in the water first while the sensor housing, release, and anchor remain on deck. Once the floatation assembly has cleared the ship, the sensor, release, and anchor assembly is dropped into the water and the entire system allowed to sink to the bottom. Shackle 96 is detachable by release mechanism 89 so that the system may be recovered upon actuation of the release mechanism by remote signal, leaving the anchor on the bottom.

An important feature of the invention is a small-volume substantially leak-tight valve system. Gas bag 13 is connected to valve 64 preferably by a high pressure thin wall stainless tube, with valve 64 having a required minimum leak rate. Bourdon tube 12 is also connected to valve 64 by a similar type of stainless tubing. Since the invention is intended to be operated at depths on the order of 5000 – 6000 meters, a pressure increase by a factor of 500 – 600 is encountered which requires that an amount of gas at least 500 times the volume of the system be available at the surface under atmospheric pressure. To avoid unwieldy containers, this volume must be minimized. With the volume of the Bourdon tube selected being about 0.5 cm$^3$ and the valve plus the tube having a volume of 1.5 cm$^3$, gas bag 13 in this embodiment must hold at least 500 × 2 = 1000 cm$^3$ and be capable of being compressed to a flat condition. This condition is achieved through the use of an initially flat polyvinylchloride container which is commercially available and is received from the manufacturer flat and empty. To provide a safety factor, a bag having a volume of 2000 cm$^3$ is used. A similar container is used for the oil bag.

The system of the present invention must be closed tightly, of course, in order to work properly. To effect such a closing, valve gear reduction system 65 is employed which includes a geared down pulley system driven by a pressure equalized stepping motor to provide the closing torque. The minimum closing torque required for the valve 64 used is 10 in-lb and the valve gear reduction system 65 used provides a maximum of 16 in-lb for a positive seal and takes one minute to close. This closing time is preferred so that no undesired pressure transients are produced upon closing. Excess closing torque is precluded because the stepping motor selected stalls at its maximum torque.

The solid state optical system used provides a frictionless no-load coupling to Bourdon tube mirror 15. Diode 17 in the present embodiment is a Gallium Arsenide solid state light emitting diode focused by an appropriate glass lens for use in oil. The photocells are light in weight and evenly matched, each having a peak response at substantially 850 mu. Stepping motor 69 is a Slo-Syn-25-1101. The oil used is a silicone oil, Dow-Corning 200 fluid, 5 cs viscosity which is substantially transparent to the light emanating from diode 17. The photocell receivers have a capture range of 20 mm while the motor 69 used steps at a maximum speed of the equivalent of 20 mm per minute. This speed can be increased for other applications, e.g. the detection of tsunamis.

Overall system requirements are only 90 mw of power at 5 volts. The low power high efficiency driver system operates at an efficiency of 99.5 percent, with this efficiency defined as the ratio of total power — standby power to total power. The stepping motor is selected and preferred for such low power application because it supplies adequate holding torque but does not require any standby power. The absence of brushes in the motor increases its dependability and allows the motor to be free-flooded with oil at any pressure. The driver circuit, which can reversely operate the motor, draws a standby power of 3 mw and an operating power of 800 mw. The flexibility of the driver circuit permits it to be used in both a pulsed mode for the optical servo system and a dc mode for full power capability with the valve motor. The motor phase is stored in C-MOS flip-flops which are wired as a synchronous reversible counter, counting up to drive the motor forward and down to reverse it.

The angular position readout system for table 16 comprises rotatable capacitor 74 and RC oscillator 32 which is coupled thereto. This oscillator operates on 15 mw and has a short term stability of 1 part in 10$^6$ over a period of ten minutes. Capacitor 74 is machined from a single piece of aluminum, its rotor has 11 plates each .318 cm thick and it has a diameter of 2.54 cm. The stator has ten plates each .267 cm thick. Spacing between plates is .025 cm and the entire capacitor is immersed in the oil in case 11. The capacitor has a maximum capacitance of 200 p$^f$ and is connected directly to the shaft of table 16 so as to eliminate gear backlash. The variation of capacitance causes a variation of frequency of from 897 to 3770 Hz. A linear output, however, is achieved by calibration. The high impedance follower circuit reduces stray capacitive and resistive loadings across capacitor 74 to a low value so that the frequency of oscillation is truly a function only of the transducer capacitor and a precision stable wire-wound resistor. The invention therefore makes advantageous use of the inherent digital nature of a frequency output since averaging of the signal requires only counting over the specified time — avoiding the necessity for an analog-to-digital converter. The potentially infinite resolution of capacitor 74 is a distinct advance over the step function resolution of optical shaft position encoders.

Temperature sensitive crystal 40 and its associated electronics require on the order of five times less power than commercially available temperature gauges having the higher power requirements that are required for this invention. Crystal 40 operates at a frequency of 10 MHz at 0°C with a slope of 830 Hz/°C. The crystal is placed in the pressure case 3 cm from Bourdon tube 12 in order to effectively monitor the temperature of the argon trapped inside the tube. Since the pressure change with temperature of dry argon at a pressure of 6000 m is 3.40 mb/millidegree, a measurement accurate to 10$^{-4}$ °C is required and achieved to obtain a pressure reading correct to 0.34mb.

A digital data acquisition system is required in recorder 37 which records up to 18 bits each of pressure, temperature and time signals for one year with the present tape capabilities. It will be appreciated that only minor changes would be necessary to modify the system for use with a tape recorder having a much larger data capacity.

The total power drain of the instrument, excluding the release which has its own battery, is about 32 ma from the positive supply and 16 ma from the negative supply. Batteries 90 – 91 which provide this power are WISCO DD-5-3ES charge-retaining batteries whose capacity is 220 ampere hours each. For deep submergence, these batteries are provided with an epoxy top seal with the undercover voids filled with epoxy.

What is claimed is:

1. A self contained deep sea pressure gauge for measuring and recording pressure and temperature stably and accurately over long periods of time at the sea floor comprising:

a pressure sensor for converting pressure variations from an initial sea floor reference pressure into signal form, a temperature sensing system for converting very small temperature fluctuations in the vicinity of said pressure sensor into signal form, an optical servo system associated with said pressure sensor for measuring said pressure variations;

a fluid tight housing containing said pressure sensor, said temperature sensing system and said optical servo system;

a fluid supply outside of said housing exposed to ambient sea water pressure;

a fluid in said housing and means communicating between said housing and said fluid supply to maintain ambient pressure in the fluid in said housing;

means in said housing for transforming said pressure and temperature signals into recordable form and for recording said signals; and means for deploying and retrieving said housing, whereby a long term record of pressure and temperature variations at the sea floor may be readily obtained.

2. The device as defined in claim 1 and further including means for establishing said reference pressure in said pressure sensor upon said pressure gauge reaching the sea floor, said means for establishing reference pressure including a gas supply disposed outside of said housing exposed to ambient sea water pressure, means communicating between said pressure sensor and said gas supply, and means for closing off said pressure sensor from said gas supply upon said gauge having reached temperature equilibrium at the sea floor.

3. The device as defined in claim 2 wherein said pressure sensor is a hollow helical fused quartz tube secured at one end unrestrained at its other end; and a mirror mounted on said other end within the scope of said optical servo system so that rotary motion of said helical tube and said mirror in response to ambient pressure variations will be detected by said optical servo system.

4. The device as defined in claim 3 wherein said temperature sensing system includes a temperature sensitive quartz crystal and a crystal oscillator controlled by said temperature sensitive quartz crystal; and means in said housing for averaging said pressure and temperature signals over a selected time interval and for recording the averaged signals.

5. The device as defined in claim 4 wherein said retrieving means includes a frame, an anchor and means for releasing said anchor by remote signal and said deploying means includes floatation means and means for supporting said frame from said floatation means.

6. The device as defined in claim 5 wherein said averaging means include a time register, a clock and control means for averaging said signals and controlling the closing off of said pressure sensor from said gas supply.

7. The method of measuring and recording pressure stably and accurately in situ at great depths over long periods of time comprising:

establishing the sea floor pressure as a reference pressure;

converting variations from said reference pressure into detectable motion;

optically detecting and following said motion;

converting temperature variations at the pressure sensor into signal form;

averaging said pressure and temperature variations;

recording the averaged pressure and temperature variations by means of a recorder; and retrieving the recorder by remotely actuated release.

8. A pressure gauge for measuring and recording pressure and temperature stably over long periods of time at the sea floor comprising:

a hollow helical tube secured at one end and unrestrained at its other end;

a mirror mounted at said other end at the longitudinal axis of said tube for rotation relative to said axis;

a fluid tight housing containing said tube and said mirror;

a flexible gas container disposed outside of said housing;

means connecting said gas container to the interior of said tube in sealed relationship with said housing;

a flexible liquid container disposed outside of said housing and means connecting said liquid container with the interior of said housing in sealed relationship therewith, a selected volume of argon in said gas container;

a liquid filling said housing and a selected additional volume of said liquid in said liquid container;

a sensing system for directing a beam of light onto said mirror; and said sensing system including light-sensitive means for detecting directional changes in the reflected light and means for detecting and recording the rotational movement of said mirror in response to differences in the pressure within and exterior to said tube; and temperature sensing means disposed adjacent said tube for detecting and recording temperature changes in the gas within said tube.

9. The pressure gauge as defined in claim 8 wherein said flexible gas container is a gas bag and said flexible liquid container is a bag for containing oil;

a valve in the means connecting said gas bag to said tube; and means in said housing for closing said valve when the pressure gauge has come into temperature equilibrium at the sea floor.

10. The pressure gauge as defined in claim 9 wherein said sensing system is mounted on a rotatable platform disposed adjacent said mirror;

said sensing system including a pulsed light driver for providing pulsating light, a differential detector for detecting changes in the direction of the reflected light, and a reversible stepping motor and driver operably connected to said differential detector and adapted to rotate said platform in response to changes in the direction of light reflected by said mirror.

11. The pressure gauge as defined in claim 10 and further including follower means axially connected to said platform, an RC oscillator and a frequency counter, said follower means directly coupled to said RC oscillator and said frequency counter for translating movement of said platform into data for recording.

12. The pressure gauge as defined in claim 11 and further including a crystal oscillator coupled to said temperature sensing means, a reference oscillator having a constant frequency of oscillation, and a mixer coupled to said crystal oscillator and said reference oscillator for providing a frequency count which is proportional to the temperature detected by said temperature sensing means,
   whereby when said tube rotates in proportion to the pressure differential between the temperature stabilized pressure at valve shut-off and the ambient pressure, the pressure signals derived and the temperature signals derived are averaged over a selected time interval and are selectively recorded on tape in said recorder.

* * * * *